United States Patent [19]

Rosen et al.

[11] Patent Number: 4,910,520

[45] Date of Patent: Mar. 20, 1990

[54] HIGH SPEED SYNTHETIC RADAR PROCESSING SYSTEM

[75] Inventors: Robert A. Rosen, Santa Monica; Arnold E. Victor, Marina Del Rey; Kapriel V. Krikorian, Los Angeles, all of Calif.

[73] Assignee: Hughes Aircraft Company, Los Angeles, Calif.

[21] Appl. No.: 80,181

[22] Filed: Jul. 30, 1987

Related U.S. Application Data

[63] Continuation of Ser. No. 720,660, Apr. 8, 1985, abandoned.

[51] Int. Cl.$^4$ ............................................. G01S 13/90
[52] U.S. Cl. ...................................................... 342/25
[58] Field of Search .......................................... 342/25

[56] References Cited

U.S. PATENT DOCUMENTS

| | | | |
|---|---|---|---|
| 4,292,634 | 9/1981 | Wu et al. ................................ | 342/25 |
| 4,339,752 | 7/1982 | Williams et al. ....................... | 342/25 |
| 4,471,357 | 9/1984 | Wu et al. ................................ | 342/25 |
| 4,594,593 | 6/1986 | Nohmi .................................... | 342/25 |
| 4,694,300 | 9/1987 | McRoberts et al. ................... | 342/195 |

FOREIGN PATENT DOCUMENTS 2086169  5/1982  United Kingdom .................... 342/25

OTHER PUBLICATIONS

Bonfield et al, "Synthetic-Aperture-Radar Real-Time Processing", IEE Proc., vol. 127, Pt. F, No. 2, Apr. 80, pp. 155–162.

Sondergaard, "A Dual Mode Digital Processor Medium Resolution SAR", Conf. Radar, 1977, London, England, pp. 384–390.

*Primary Examiner*—Thomas H. Tarcza
*Assistant Examiner*—Gilberto Barrón, Jr.
*Attorney, Agent, or Firm*—Leonard A. Alkov; Wanda Denson-Low

[57] ABSTRACT

A synthetic aperture radar processing system receiving return data from a plurality of transmitted pulses which utilizes frequency alignment for partitioning the received data into patches of data in an orderly sequence, a plurality of patches of data being formed in each of a plurality of range subswaths and being sequentially aligned in range columns. For each subswath, the return data is filtered in patch filters having wide bandwidths and passband overlaps selected so that each patch of data is totally included within a passband. The patch filters are selected for each subswath to provide sequential columns of data. Each patch of data for each subswath is then frequency shifted to an interpolator narrow band filter having a passband selected so that data outside of each patch is eliminated. As a result, the patches of data at the outputs of the interpolators are in the proper sequence for each column to be further processed without the addressing and bookkeeping problems associated with partitioning of data into patches with conventional patch filter banks.

3 Claims, 14 Drawing Sheets

Fig. 1.
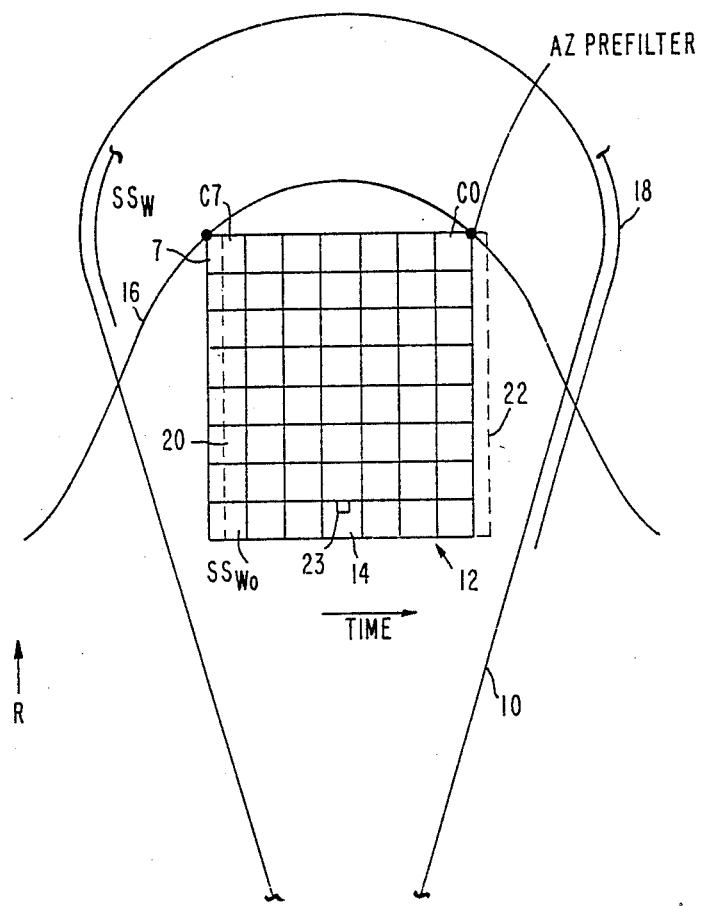
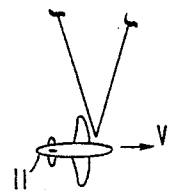

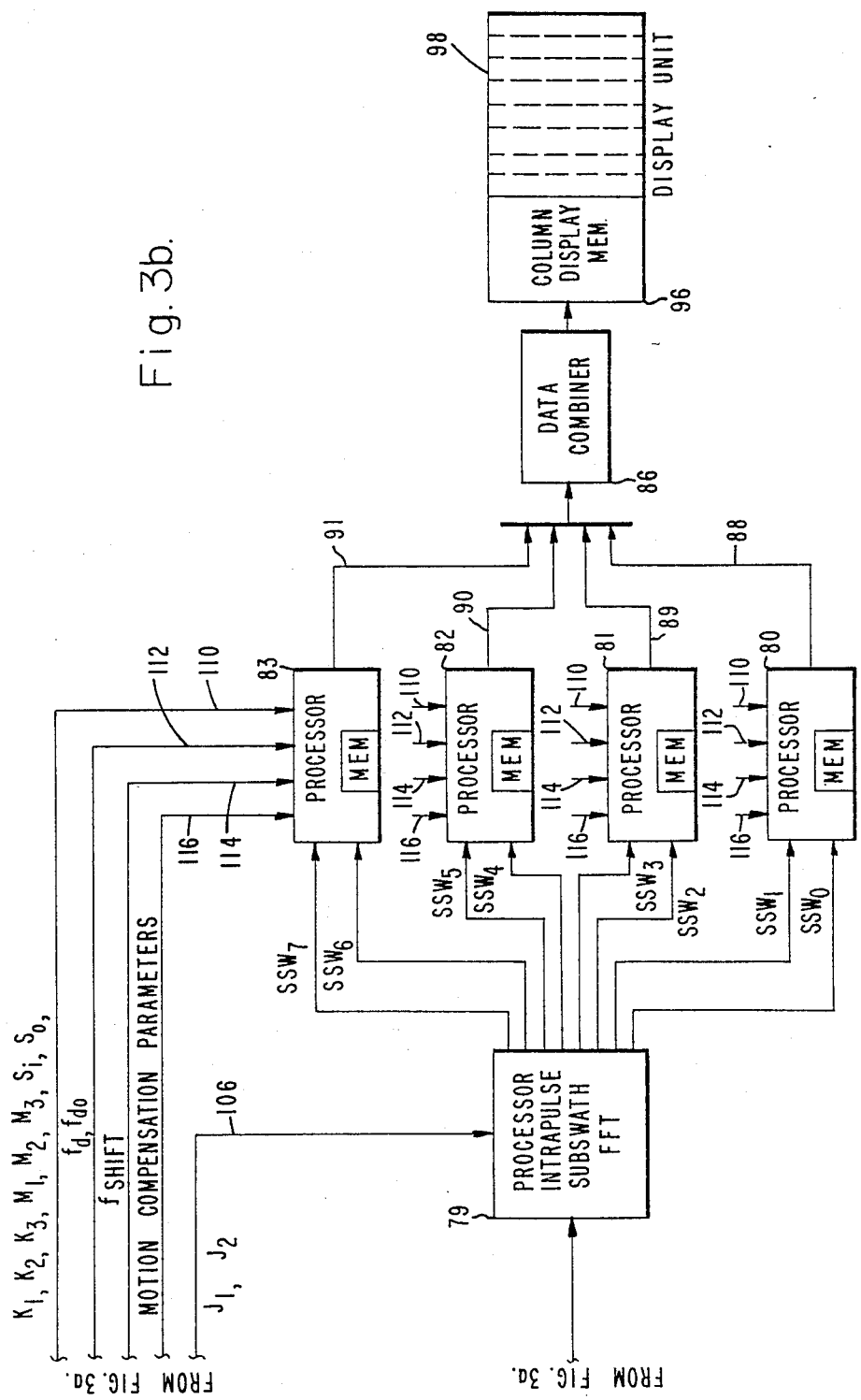

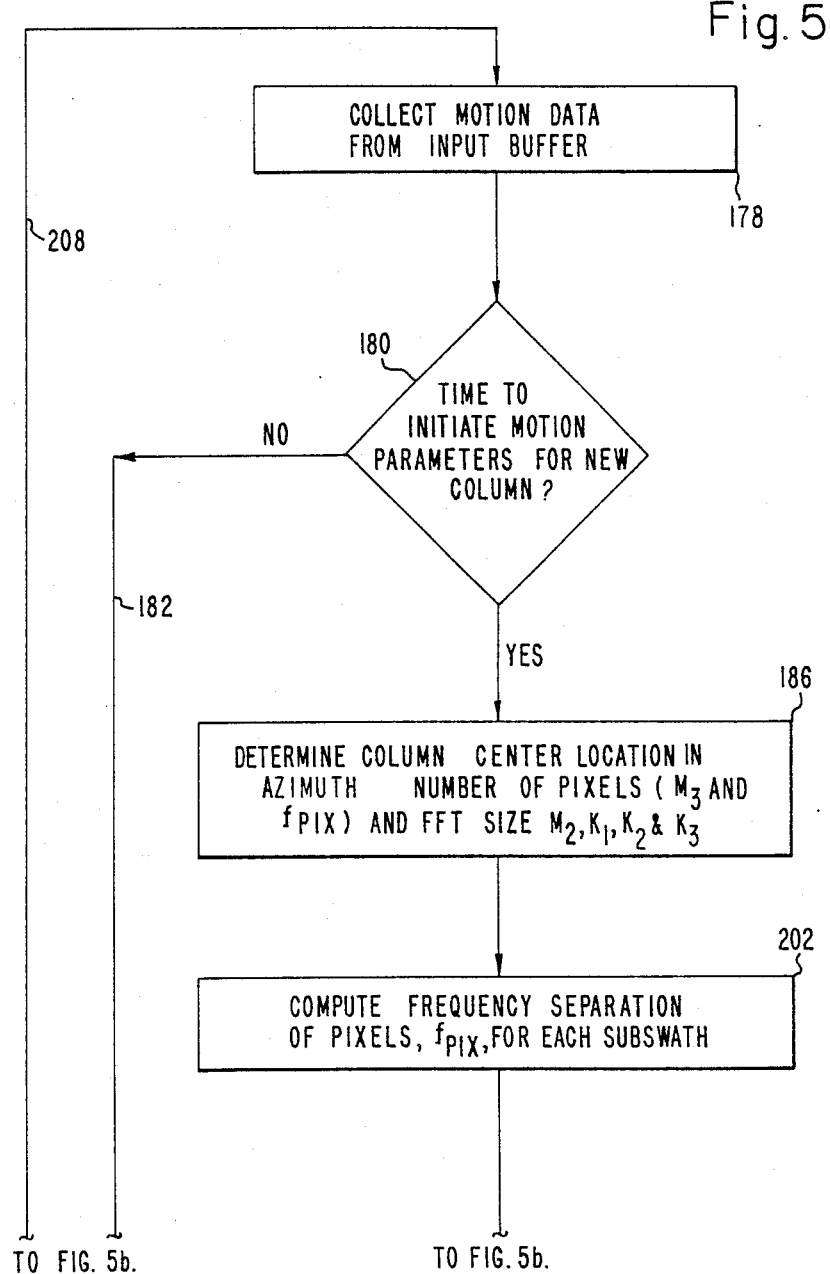

Fig. 12.
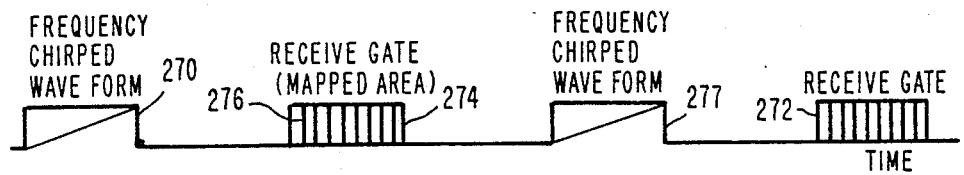
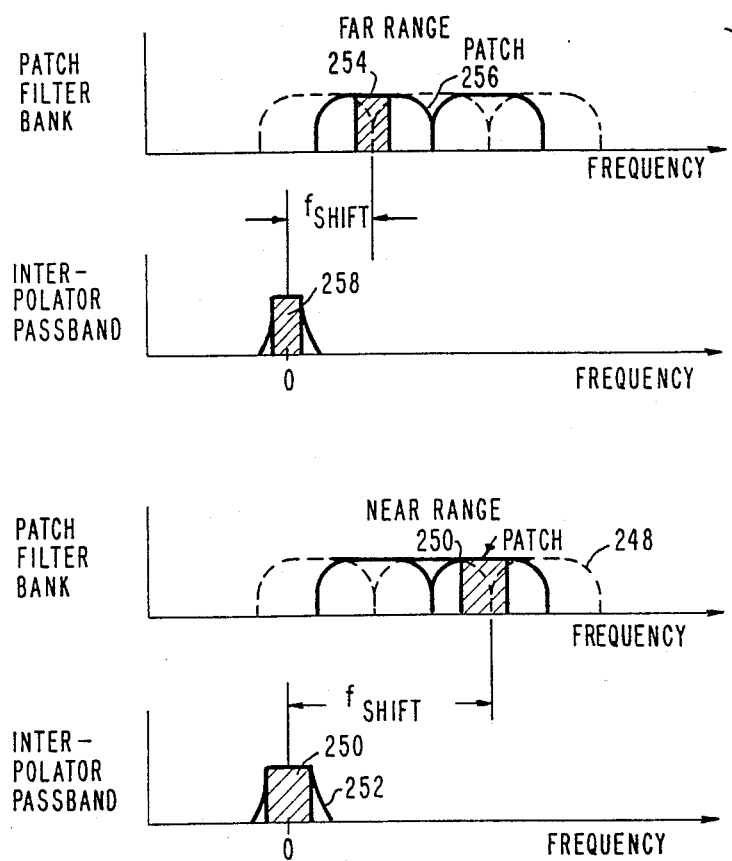
Fig. 10.

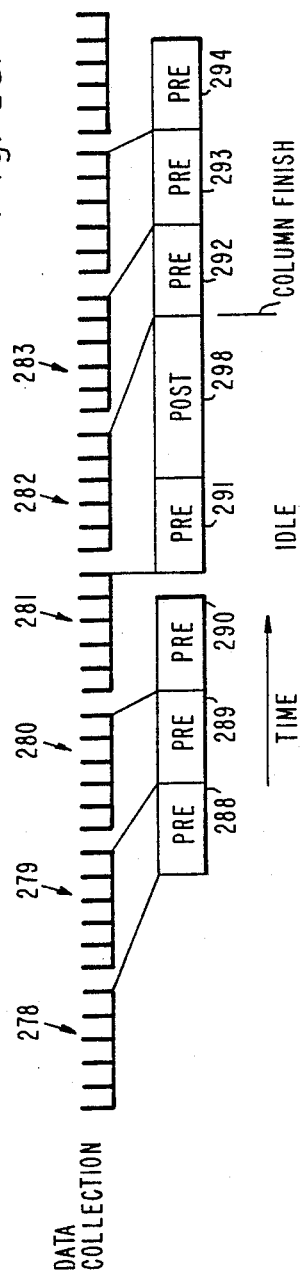
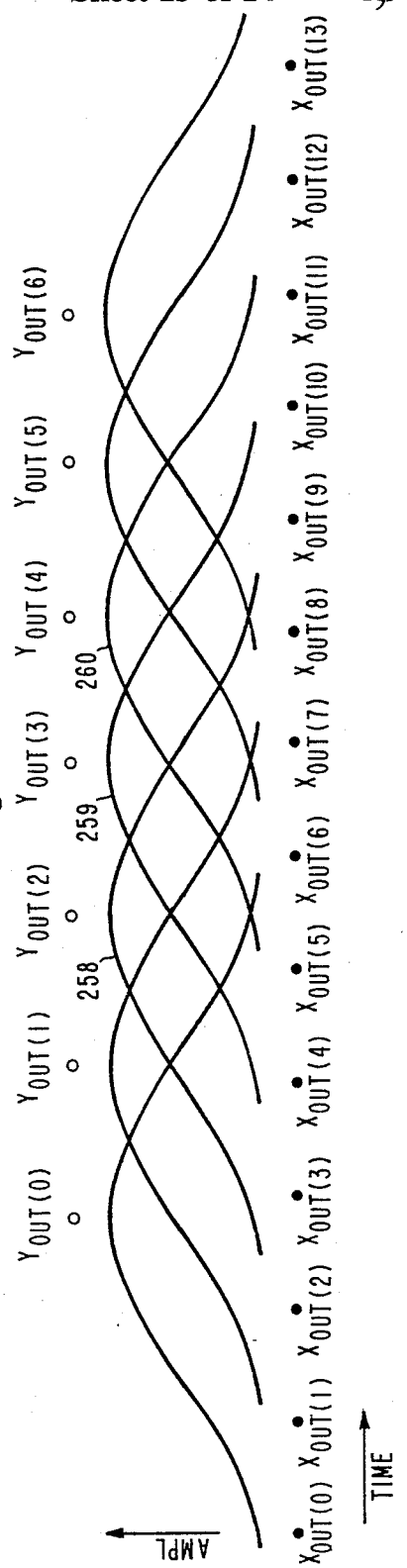

HIGH SPEED SYNTHETIC RADAR PROCESSING SYSTEM

The Government has rights in this invention pursuant to a contract awarded by the Government.

This application is a continuation of application Ser. No. 720,660 filed Apr. 8, 1985, abandoned.

TECHNICAL FIELD

This invention relates to radar processing systems and particularly to a synthetic aperture radar processing and mapping system utilizing frequency alignment of patches of data in the range subswaths of the swath or area being mapped to form sequential columns of data for minimizing the processing complexity.

BACKGROUND OF THE INVENTION

Field of the Invention

This invention is an improved high speed synthetic aperture or array radar mapping system that provides a high resolution map of the surface being illuminated, using programmable type signal processors. The system of the invention is applicable to either processing and display of the area being mapped on the aircraft or to reception and processing of the radar data at different locations. Conventional radar mapping systems, in order to process the large amount of data that is received by the radar, use patch processing in which the swath of sequential radar return data is partitioned into range subswaths and then into patches in each subswath. The system of the invention utilizes this patch processing technique, but partitions the patches of data so that they can be processed in an orderly manner with a minimum of complexity and processor loading.

Description of Related Art

Prior to this invention, high speed synthetic aperture radar processing systems performed intrapulse and interpulse processing to produce two-dimensional maps by either using path processing in which the patches of data were not aligned in range or by using polar format processing, both of which require excessive digital bookkeeping of parameters and considerable loading of the processors. The intrapulse processing consists of range dechirping the received data and segregating the data in range as a function of frequency. This range segregation includes a coarse segregation to form a plurality of range subswaths from the swath or area being mapped. A final compression in range then produces range strips of the desired resolution. The interpulse processing includes azimuth dechirping of the received data as a function of aircraft motion and geometry and then segregating of the azimuth data into patches of data for each subswath. This azimuth segregation usually includes the steps of first forming a coarse division or patches in azimuth or cross range followed by forming the final resolution cells or pixels for the display map. In order to maintain a constant interpulse data rate for each subswath so that the interpulse processing will not be excessively complex, the FFT (Fast Fourier Transform) filters for providing patch filtering are equally spaced in frequency for all of the range subswaths. The cross range spacing of the adjacent filter passbands or the azimuth distance on the mapped surface reflecting data that each filter responds to its proportional to range and thus is different at each subswath. The cross range passband width of the filters on the surface increases from near range to far range of the swath being mapped. Thus, a patch area in the center of a patch filter in a near range subswath is often not in the center of a patch filter at a far range subswath. The data is partitioned in cross range but the patch filters in different range subswaths are not aligned in cross range, resulting in increased addressing and address storage of the patches of data in the processing stages.

In order to simplify processing, it would be highly desirable if a system provided equal cross range spacing between patches in all subswaths and the patches of data were aligned across subswaths in columns of constant cross range on the surface being mapped. Also, it would be advantageous if the data rate of the processing steps were reduced to provide minimum processor loading.

SUMMARY OF THE INVENTION

The synthetic aperture radar patch processing system, in accordance with the principles of the invention, utilizes a chirped radar system on a moving vehicle such as on aircraft to illuminate swaths of a surface being mapped. The return signals from the mapped surface after being converted to sequences of I-Q digital words for each transmitted pulse and after being range dechirped are segregated first into a plurality of range subswaths by a bank of FFT filters which respond to the increase of frequency of the subswaths at increasing range provided by chirping of the transmitted pulses. The data from each subswath filter passband is then passed into a separate channel with each channel passing the data from a specific subswath to an azimuth dechirping function in which a reference frequency ramp removes the linear Doppler frequency modulation of the data. The return data of each subswath is then partitioned in a separate patch filter stage, provided by banks of FFT patch filters, in the cross range direction. The patch filters are formed so that the frequency width of each patch of data at all ranges will be within the passband of a patch filter. This allows the patches to be layed out in contiguous columns of constant cross range independently of the locations of the patch filter centers. Once a patch has been layed out, its corresponding patch FFT filter is selected based on the geometry, platform velocity and azimuth dechirp reference. The data from the selected patch filter is then frequency shifted and passed through an interpolation filter stage. The data from the interpolator filter is then passed to additional data compression stages including a final range FFT filter stage and a final azimuth FFT filter stage from which the data is detected and applied to a display unit.

Thus, in order to simplify the processing and data transfer, the system of the invention forms or partitions the patches of data from the different subswaths in a sequence so as to be lined up in range columns corresponding to columns of patches of scatterers on the surface being mapped. In order to provide the patches of data in a time sequence corresponding to aligned columns of patches on the surface being mapped, the separation of subswath data into aligned patches is performed in two stages, the patch filter stage and the interpolator filter stage. The patch filter stage for each subswath splits the data into $N_2$ overlapping filters having a bandwidth selected so that a single patch is always entirely contained within one filter passband regardless of the frequency of the data in the patch. For the patch filter stage of each subswath channel, the maximum patch bandwidth is limited to the difference between the filter bandwidth and the filter separation. The patches of data at farther range in the same column will have a smaller bandwidth than those at near range, but the same cross range width at farther range than at near range. The azimuth interpolator stage completes the filtering of each patch by individually filtering the output of each selected patch filter in an interpolator filter for each subswath with the interpolator filters all having the same center frequency. The patches of data for each subswath are frequency shifted in the interpolator process so that the center of the patches of column data for each subswath are aligned in frequency with the center of the corresponding interpolator passband. The passbands of the interpolator stages are not significantly wider than the patch bandwidth. As a result of the patch filters and the interpolator function, the patches are aligned in cross-range to sequentially form the columns of patches of data corresponding to the surface being mapped.

The wide overlapping patch filters pass considerably more ground return data than required, but the narrower band filtering of the interpolator filters reduces the amount of data to be processed in the subsequent processing stages. Thus, the wide overlapping patch filters and the frequency shifting of selected patches of data to the center frequency of narrow band interpolation filters provides alignment of the patches resulting in a minimum of storage and access complexities for the system processing stages. The interpolator stage also performs a resampling function so that the output data rate is reduced to further reduce processor loading.

It is, therefore, an object of the invention to provide a high speed synthetic aperture radar mapping system that performs the processing with a minimum of data handling and processing complexities.

Another object of the invention is to provide a high speed synthetic aperture radar processing system that reduces the data rate consistent with the required resolution with a minimum of processing stages.

Another object of the invention is to provide a patch processing system for synthetic aperture radar in which the data is partitioned into patches of data in a time sequence corresponding to aligned columns of patches on the surface being mapped.

Another object of the invention is to provide a simplified synthetic aperture radar processing system in which the patches of column data are aligned in columns in all subswaths so that the data can be processed in the proper sequence without undesired addressing complexities.

It is still a further object of the invention to provide a synthetic aperture radar system which segregates the received data into patches of data at a constant data rate for all subswaths and in a sequence corresponding to the positions of the aligned columns on the surface being mapped.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings in which like reference numerals refer to like parts and in which:

FIG. 1 is a schematic diagram of range and cross range in the dimension indicated as time showing a radar beam illuminating a swath of a surface being mapped with the swath being divided into subswaths, patches and columns;

FIGS. 3a and 3b show a schematic block diagram of a synthetic aperture radar mapping system in accordance with the principles of the invention;

FIGS. 5a and 5b show a general purpose computer flow diagram for explaining the formation of control parameters for the processing steps of FIGS. 4a–4c;

FIG. 10 is a schematic diagram of amplitude as a function of frequency for explaining the operation of the interpolator stage relative to the patch filter passbands;

FIG. 11 is a schematic diagram showing, on a time scale, data from a plurality of pulses and the amplitude weighted and summed signals for further explaining the operation of the interpolator stage;

FIG. 12 is a schematic diagram showing the transmitted and received pulses as a function of time for explaining range dechirp;

FIG. 13 is a schematic diagram showing input pulses as a function of time for explaining data collection and processing in the system timing.

DESCRIPTION OF THE PREFERRED EMBODIMENTS

Figure 2:
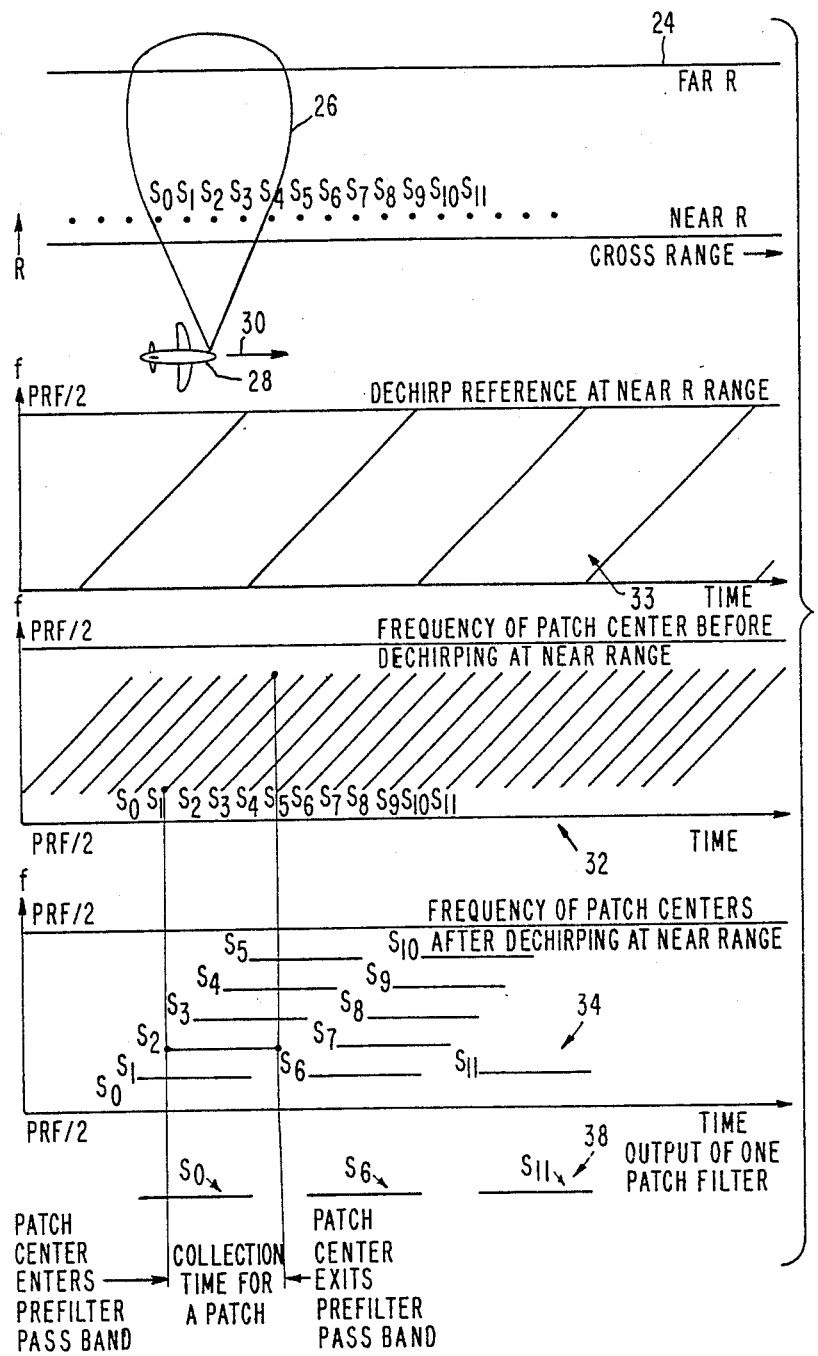
FIG. 2 is a schematic diagram showing the geometry of an aircraft in motion transmitting a radar beam along a surface area of scatterers at a near range and waveforms of frequency as a function of time showing the processing of the signals derived from the near range scatterers over repetitive swaths provided by aircraft motion.

Referring first to FIG. 1, which shows the subswaths, patches and columns of patches in a swath surface area illuminated by a moving radar beam, the division of the surface into areas and continuous reception of the data will be explained. A radar beam 10 illuminates in response to each transmitted pulse from a transmitter in a craft 11, a surface or ground area including a swath 12 which, in the processing system of the invention, is divided into subswaths $SSW_0$ to $SSW_7$. Each subswath is then partitioned into patches of data such as a patch 14 of the subswath $SSW_0$ to form a plurality of aligned columns $C_0$–$C_7$ of data in accordance with the principles of the invention, with the division of data into columns of spatially aligned patches being maintained in sequence during the processing steps to simplify data handling and processing. Each column and patch of data is partitioned and processed in the corresponding position on the surface being mapped to form a map of the swath 12 and other swaths. The cross range width of the swath 12 which is in the dimension indicated as time is determined by an azimuth pre-filter passband 16, and the range dimension of the swath 12 is determined by range or time gating of the received data, as is well known in the art. As the craft 11 containing the radar system moves in time in a direction which is a function of the cross range direction as shown by a beam 18, the swath 12 covers a different area of the surface being mapped, as shown by dotted lines 20 and 22. Each column $C_0$–$C_7$ has reflected data from a progressively different ground area and, in the position shown, the swath of data represents a beam width of data as defined by the pre-azimuth filter passband 16. All of the return signals from a swath width contain data from each scatterer within that swath.

Each scatterer such as 23 is illuminated by all the transmitted pulses of energy as the craft moves an entire swath width. As the craft moves to the position of the beam 18, column $C_0$ of the data being received by the radar is being filled with new column $C_0$ data, in response to the continuing transmission of radar pulses. When the craft 11 has moved an entire swath width to the right of the position shown by the swath 12, the data of each column $C_0$–$C_7$ is entirely new data and each of 8 columns of the swath 12 has been processed and displayed. Thus, the formation of the swath of data is continuous and as the return sequence of data from each transmitted pulse is received by the radar, it can be processed in a continuous manner. A reference signal, which is a frequency ramp in the motion compensation processing, will provide position identification in azimuth of each pixel of data.

Referring now to FIG. 2, the geometry of a plurality of near range scatterers relative to a craft moving along the strip to be mapped the azimuth pre-filter passband and the frequency versus time processing of the scatterers at several cross ranges is shown. The frequency relationships of the reflected data will be explained. A strip 24 of the surface being mapped is illuminated by a radar beam 26 transmitted from a moving craft 28 which for group mapping may be an aircraft. It is to be noted that the system of the invention is applicable to mapping of not only ground and water areas on the surface of the earth from vehicles such as airplanes, space vehicles, or satellites, but includes mapping of bodies in space, such as moons or planets, from space vehicles such as satellites. The craft 28 moves along the strip 24 with a velocity V in a direction 30 transmitting pulses of energy and receiving return energy at an angle $\theta$ relative to the direction 30. The beam 26 illuminates scatterers $S_0$–$S_{12}$, with each scatterer representing the scatterer at the center of a different patch of the near range subswath, as the beam 26 moves to different positions along the strip 24. Signals 32 from scatters $S_0$ to $S_{12}$ represent the frequency excursions in cross range or azimuth of the I-Q words received derived from the near range scatterers at the center of each patch. The signals 32 have a frequency excursion with $-PRF/2$ and $PRF/2$. Azimuth dechirp reference frequency ramps 33 are utilized in motion compensation and at each range subswath have a slope that matches the frequency slope of the pixels at the patch centers of the signals 32. The frequency versus time slopes of the ramps 33 for each subswath are to match the slope of the data, such as signals 32, which decrease at increasing range. The ramp reference signals 33 which are repetitive between $-PRF/2$ and $PRF/2$ allow pixel return signals and azimuth patches to be identified in the system of the invention. Signals 34 represent the signals $S_0$–$S_{12}$ after azimuth dechirping by the azimuth dechirping in the azimuth dechirp function, with the signals of each swath having a different frequency. Each center of patch signal such as $S_0$ extends in time from the time that the patch center enters the pre-filter passband to the time that the patch center exits the azimuth pre-filter passband.

Signals 38 represent the data from one patch filter passband which passes only signals $S_0$, $S_6$, $S_{12}$ and other signals at that passband which may be from different patches of the subswath being processed as the craft 28 moves along the strip 24. Each patch filter passes all of the data from a specific patch or from a number of patches appearing in the same patch filter passband along the corresponding subswath, such as the illustrated near range subswath. The signals 34 only show six simultaneous patches being partitioned for convenience of illustration, but it is to be understood that a different number of patches may be utilized.

Figure 3A:
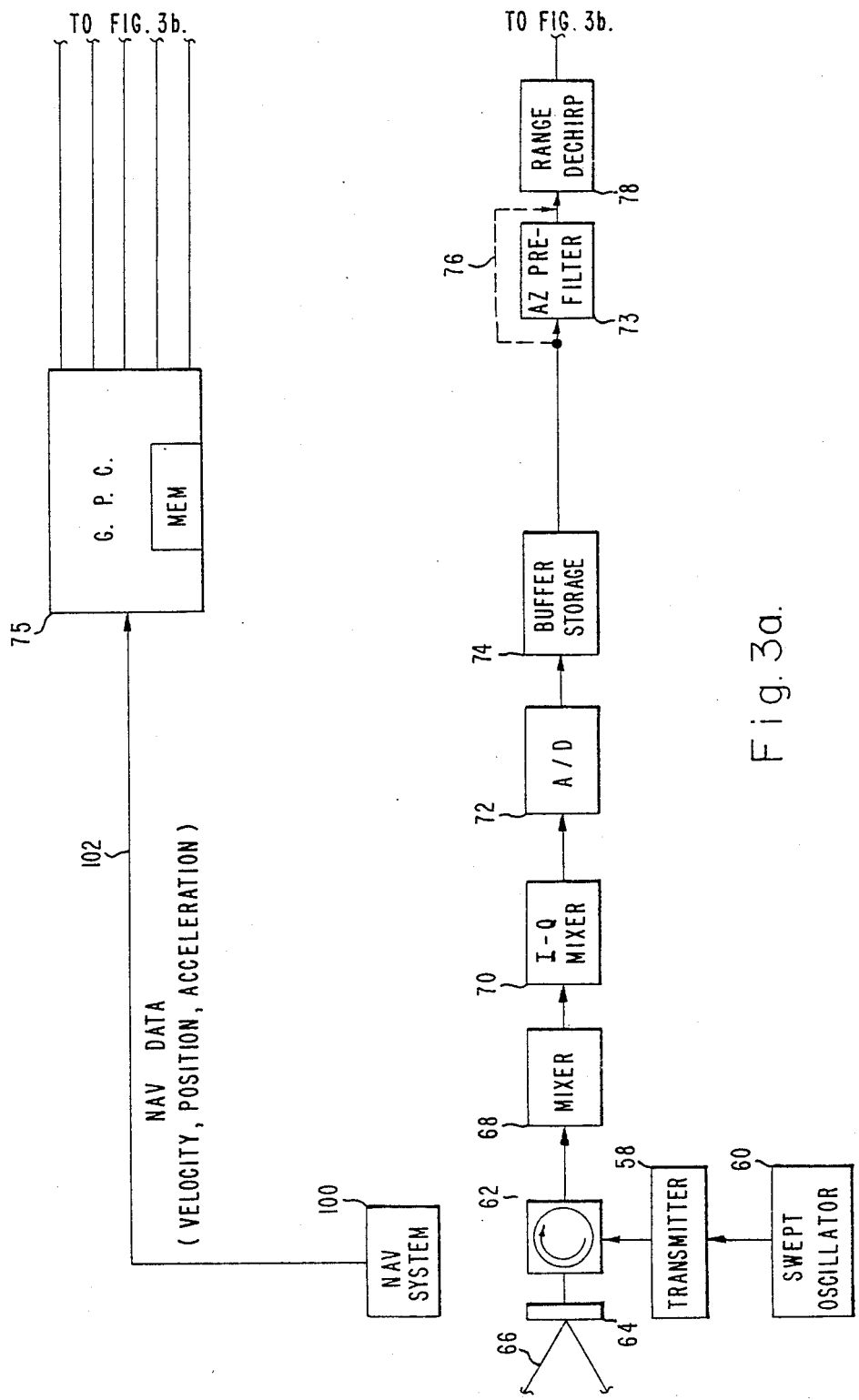

Referring now to FIGS. 3a and 3b which together are a block diagram of a synthetic aperture radar system incorporating the processing system in accordance with the principles of the invention, the system arrangement and operation will be explained. A coherent pulse transmitter 58 responds to a swept oscillator 60 to develop coherent chirped output pulses of radio frequency (RF) energy at a desired PRF (pulse repetition frequency) which are applied through a duplexer unit 62 to an antenna 64 for transmission into space. The RF output pulses applied to the antenna 64 are radiated as an illuminating beam 66 which is directed to a desired surface area to be mapped. The RF energy reflected to the antenna 64 from scatterers or surface scatterers within the beam 66 is applied from the antenna 64 through the duplexer unit 62 to a mixer 68 which translates the received RF return energy to an intermediate frequency band. The output signal from the mixer 68 after suitable amplification is then split in an I-Q mixer 70, as is well known in the art. The I-Q mixer 70 which provides in-phase and quadrature phase detection splits the data into an in-phase channel and a quadrature phase channel, the data being then transferred as I (in-phase) and Q (quadrature phase) data in the processor system until video detection. An A/D (analog-to-digital) unit 72 samples, at a desired sample rate, the I and Q data derived from each received pulse and converts the IF signals to a time sequence of pairs of I-Q digital words of the desired precision, each I-Q word having a binary amplitude value. The return data is then applied to a buffer storage unit 74 which may store several input pulses of data or sequences of I-Q words derived from a transmitted pulse. An azimuth pre-filter 73 is provided and may include an azimuth presumming unit which may combine corresponding I-Q words for a selected number of pulses; when AZ presumming is utilized. A dotted composite lead 76 shows that in some systems in which the concept of the invention may be utilized, azimuth presumming may not be required. The azimuth pre-filter 73 forms the passband 16 of FIG. 1 and at a selected PRF has a passband determined to prevent cross range ambiguity and undesired folding of the spectrum as is well known in the art. The I-Q data is then passed from the presum unit 73 or from the composite lead 76 to a range dechirp unit 78 and, in turn, to the intrapulse subswath FFT unit 79 where the data is filtered into a plurality of subswath channels as a function of frequency, the data having a greater frequency at greater range as a result of the chirped transmitted pulses. The subswath FFT unit 79 may, for example, include a separate signal processor that forms a plurality of FFT filters in response to the data from each transmitted pulse to provide K, samples I-Q words for each subswath. In some systems in accordance with the invention the range dechirp unit 78 may precede the azimuth filter unit 73.

In the illustrated system, eight subswath channels of data are provided by the subswath FFT unit 79 with each two adjacent channels of subswaths $SSW_0$–$SSW_7$ being coupled to a different processor of programmable signal processors 80–83. The system is not to be limited to each processor handling two subswaths of data but each processor such as 80–83 may process any desired number of subswaths of data depending on the processing speed desired. The programmable processors 80–83 may be suitable processing units, as well known in the art, such as described in PCT International Publication No. WO 80/00758 having a publication date of 17 April, 1980 which is derived from U.S. Pat. No. 4,541,048.

The processors 80–83 perform azimuth dechirping, patch filtering, azimuth interpolation, range compression, azimuth compression, detection, output buffering and data transfer of columns of data to a data combiner 86 through respective composite leads 88–91. As will be explained in further detail subsequently, the patch filters in the illustrated system partition each subswath of data into eight azimuth patches of data. The data combiner unit 86 combines the processed data in the proper sequence forming each completed column and transfers each completed new column of data to a memory 96 and, in turn, to a display unit 98. It is to be noted that, as each new column is transferred to the memory 96, the oldest column of data is erased from the display so that a continuous map is formed in the display unit 98 of the swath positions as shown in FIG. 1.

The general purpose computer (GPC) unit 75 provides control signals to the units of the system including the subswath FFT unit 79 and the processors 80–83. The GPC unit 75 receives navigational data such as velocity, position, and acceleration from a navigational system 100 through a composite lead 102. The GPC unit 75 provides on a composite lead 106 to the subswath FFT unit 79 the parameters $J_1$ which is a system constant representing the number of intrapulse samples to be amplitude weighted and the parameter $J_2$ which is a system constant representing the number of FFT filters to be formed. The filtering operation of the subswath FFT processor 79 is similar to the filtering formed in the patch processing which will be explained subsequently.

The GPC unit 75 also provides to the processors 80–83 on a composite lead 110, the parameters $K_1$, $K_2$, $K_3$, $M_1$, $M_2$, $M_3$, $S_i$ and $S_o$ to execute patch filtering, interpolation, final range filtering and final azimuth filtering. Composite leads 112, 114 and 116, respectively, provide signal $f_d$, $f_d$ and $f_o0$ from which a filter number of interest signals $n_f$, are formed in the processors, an $f_{shift}$ signal and motion compensation parameters to the processors 80–83. Each of the signals on the composite leads 110, 112, 114 and 116 will be explained subsequently relative to the processing steps performed in the processors 80–83.

Figure 4A:
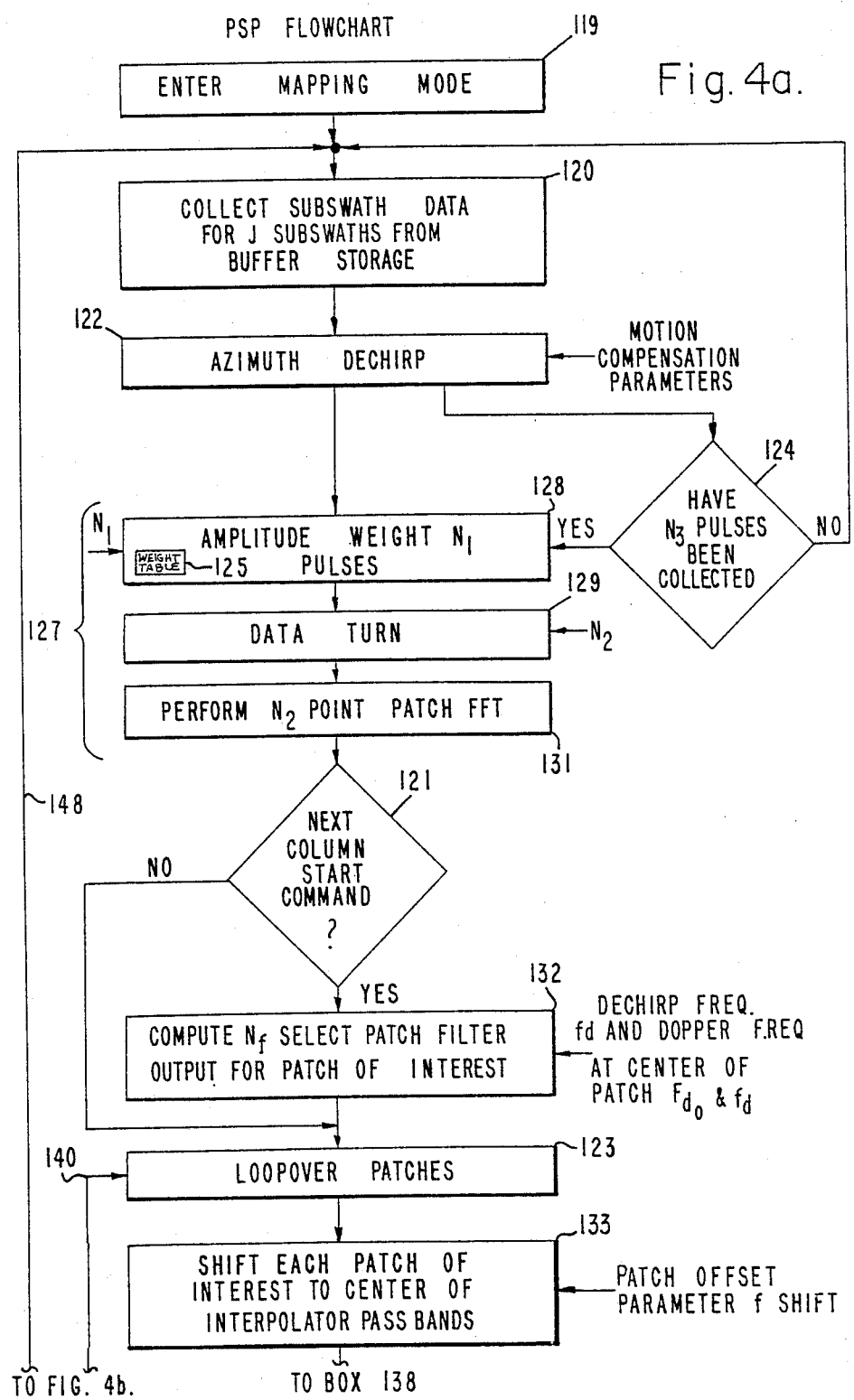
FIGS. 4a–4c show a processor flow diagram for explaining the processing steps in the programmable signal processor.
Figure 4B:
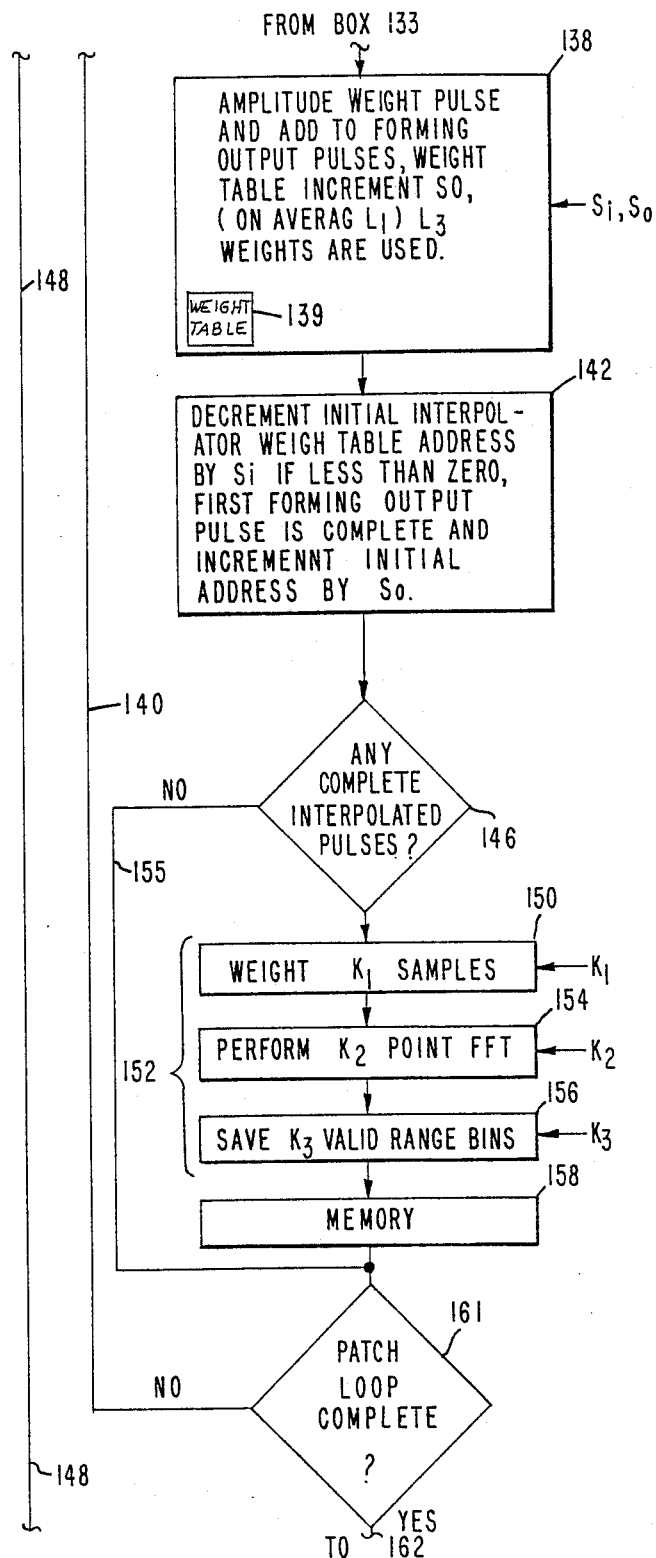
Figure 4C:
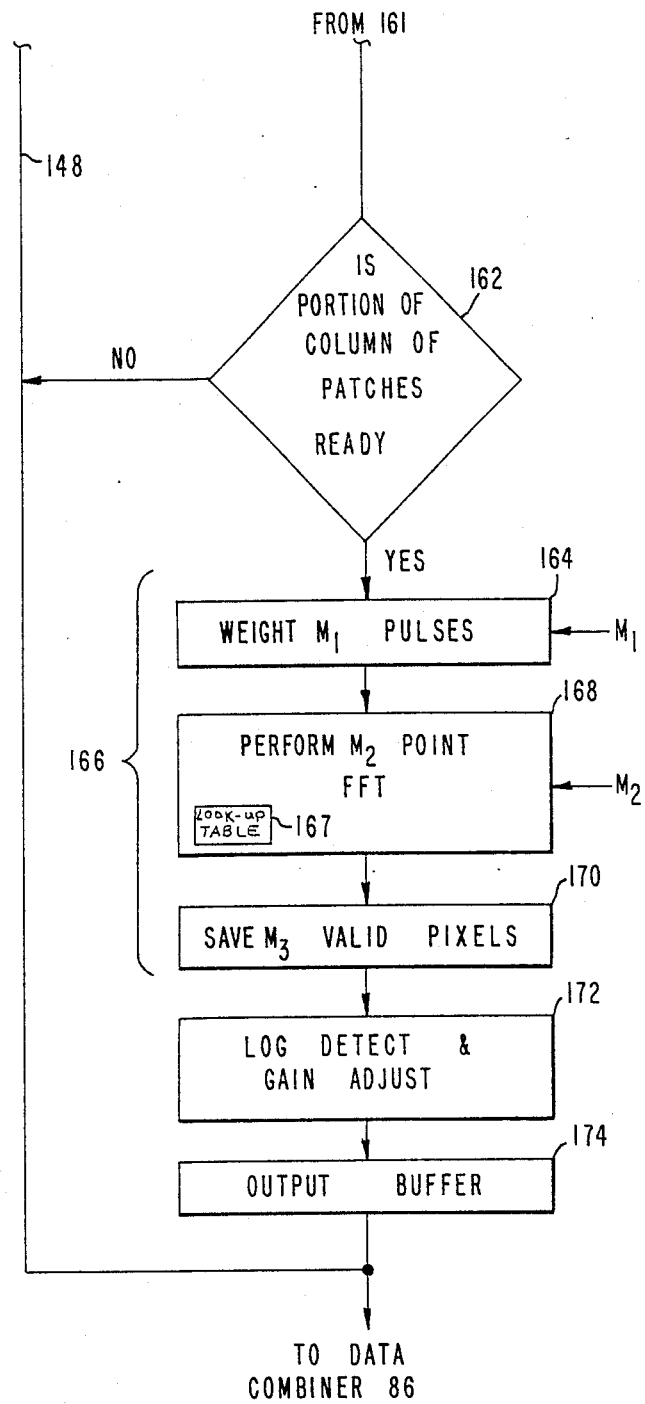
Figures 6, 7:
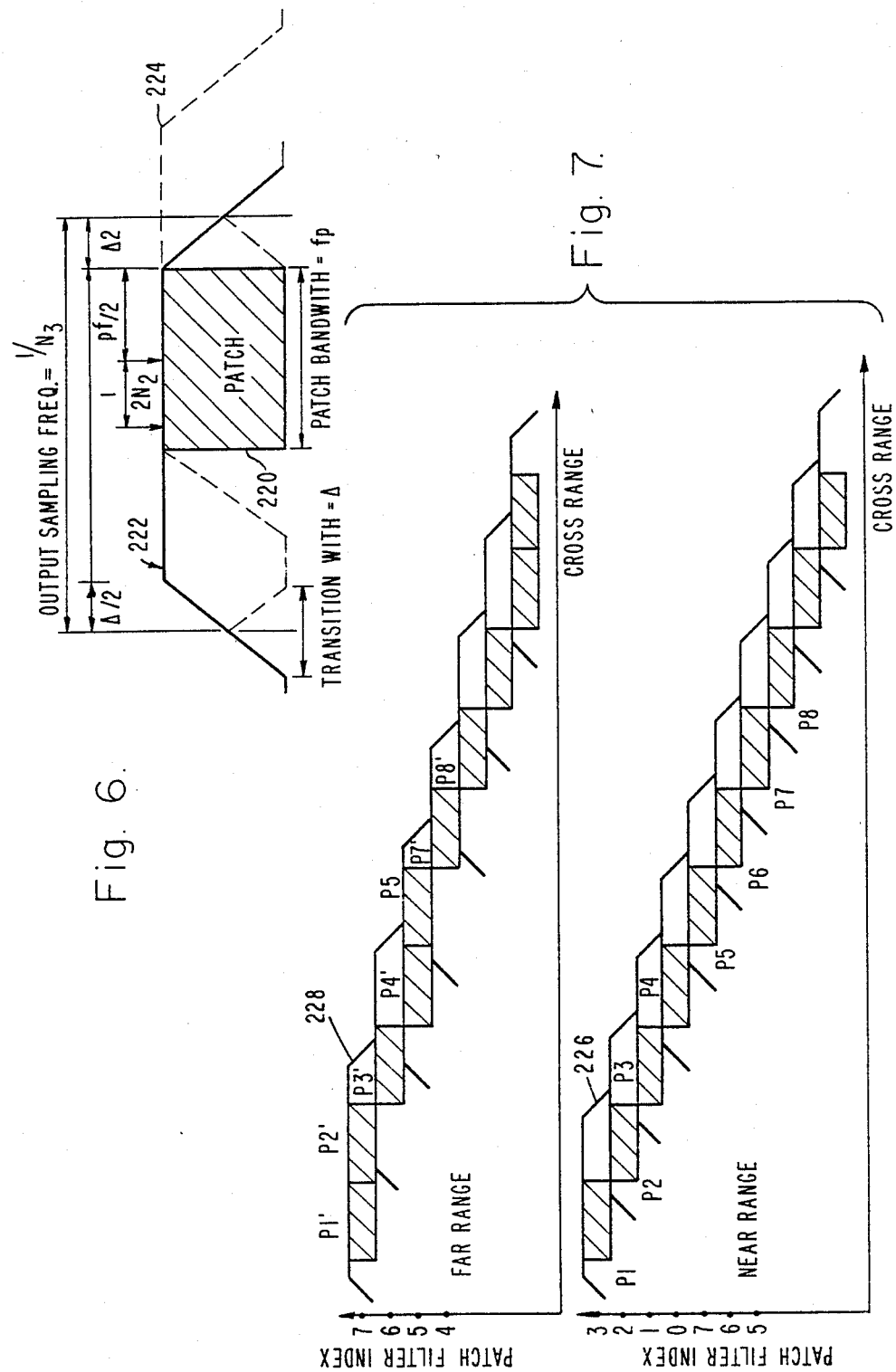
FIG. 6 is a schematic diagram of frequency as a function of amplitude showing patch filter passbands for explaining the selection of patch filters.
FIG. 7 is a schematic diagram showing FFT patch filter banks in cross range as a function of filter index at a near range subswath and at a far range subswath.

Referring now to FIGS. 4a–4c which together form a computer flow chart or diagram for each one of the processors 80–83, the operation starts in a box 119 in which the system enters the mapping mode. The operation then proceeds to a box 120 in which it is determined that sequences of sampled I-Q words for j subswath are collected in the input buffer unit 74 of FIG. 3a. In the illustrated processor in which each processor handles two subswaths, j is equal to 2. The next step is in a box 122 where azimuth dechirp is performed in response to motion compensation parameters to eliminate the Doppler frequency variations caused by changes of motion or path in the craft, as is well known in the art. The motion compensation parameters include reference frequency rams, in digital forms such as signals 33 of FIG. 2, which repetitively vary over the time of moving across a distance of surface to be mapped which may be more or less than a swath width. The flow diagram then passes to a decision box 124 where a determination is made whether return data sequences from $N_3$ pulses have been collected, $N_3$ being the number of skip pulses for the patch filtering function. If the answer is NO, the function returns to the box 120 on a composite lead 126 repeat the processing in the boxes 120 and 122. $N_3$ pulses of data in the input buffer unit 74. If the answer in the box 124 is YES, the function passes to a patch filtering function 127 where in a box 128, the first of $K_1$, I-Q samples of the most recent $N_1$ pulses are amplitude weighted with $N_1$ being the number of stored pulses to be weighted in a box 129, a data turn or combining of corresponding weighted samples is then performed, and in a box 131, and $N_2$ point patch FFT is performed. The term $N_2$ designates the number of FFT filters that are formed. Thus, all of the patch filtering for one subswath is performed by a single patch FFT filter bank. A sequence of $K_1$ I-Q words is processed for each patch. For this system, eight words or samples are provided by the data turn operation of the box 129, and 8 complex I-Q words are applied to the FFT filter bank 131, which integrates to provide outputs from each filter or from a lesser number of filters if data from more than one patch is passed through or widely overlapps more than one filter (FIG. 6). In the amplitude weighting for the box 128, weights from a weight table 125 are used in this process. These weights are generated using a Remez Exchange Design program as is well known in the art. The weights are generated so that passband ripple is minimized, system peak sidelobe constraints are met, and the transition width $\Delta_p$ is minimized under the constraint $P_p + \Delta_p = 1/N_3$ where $P_p$ is the passband width. The parameters $N_1$, $N_2$ and $N_3$ are constants chosen to minimize processor loading. The flow next passes to a decision box 121 where a decision is made on whether it is time to start processing data for a new column. If the answer is YES, the processing proceeds to a box 132 in which $n_f$ the patch filter output number for the new patch of interest, is computed in response to the dechirp frequency $f_d$, which identifies the azimuth position for the subswath of interest and in response to the Doppler frequency $f_{do}$ at the center of the patch. The parameter $n_f$ must be computed for each patch being processed in both subswaths because a patch of data does not always appear in the same patch filter passband. However, a patch of data is always fully enclosed within one of the passbands of the patch FFT filters. It is to be noted that the frequency at the center of the patch is usually not at the center of a patch filter. If the answer is NO, the processing in box 132 is not implemented as this processing need only be done at the start of a new column. The processing then proceeds to a box 123 where the operation loops over the active patches in sequence in each subswath, the filter number $n_f$ identifying the filter related to each patch while the $k_1$ intrapulse words are being filtered.

The next step of the processing is performed in a box 133 in which the complex I-Q word of each patch of interest is shifted so that the center of the patch is at zero frequency, using the patch offset parameter $f_{shift}$ which is a function of the dechirp frequency $f_d$, the patch center frequency $f_{do}$ and $N_3$. The parameter $f_{shift}$ is usually different for each path of each subswath so the function of the box 133 is performed in sequence for the I-Q words of the patches of interest for each of the two subswaths in the illustrated system. The processing then proceeds to a box 138 where azimuth interpolation is performed in cross range for the patches of interest for each patch by sequentially processing the corresponding words of the sequence of $K_1$ sample words in each subswath handled by the processor. Here the pulse samples are multiplied by amplitude weights determined from a look-up weight table 139 addressed by signals $S_i$ and $S_o$, where $S_i$ varies from subswath to subswath. The weights in this table are determined using a modified Remez Exchange Design program as is well known in the art. These weights are generated so that the passband ripple is minimized, sidelobe energy is minimized, system peak sidelobe constraints are met, and the transition width $\Delta_I$ is minimized under the constraint $$\frac{P_I}{P_I + \Delta_I} = \frac{M_3}{M_2},$$

where $P^I$ is the passband width. It is important that the sidelobe energy be minimized since in the interpolation process much of the sidelobe energy is aliased back into the interpolator passband. All forming azimuth interpolated output pulses (for each subswath i) are updated in this process by multiplying the input I-Q pulse data by the amplitude weight accessed from table 139 using $S_i$ and $S_o$ and then adding this result to the appropriate forming output I-Q pulse. This process is explained in more detail below. The interpolator function sequentially processes all of the data for the patches of interest in the azimuth dimension and for each range sample of each subswath.

The processor next proceeds to box 142 where the initial interpolator weight table address is decremented by $S_i$. If this index is now less than zero, the oldest forming azimuth interpolator output pulse is complete and the initial interpolator weight table address is incremented by $S_o$.

The processor then proceeds to a box 150 of a final range compression function 152. If a pulse has not been completed, the processing skips to a decision block 161 via a path 155. In the box 150, $K_1$ intrapulse samples are weighted in the range dimension and the operation proceeds to a box 154 where a $K_2$ point FFT filter bank is formed. The FFT filter in the box 154 integrates $K_2$ times samples to form a desired number of range bins, thus dividing the data which previously only generally represented time samples of the composite of several range bins into $K_2$ range bins. The operation then proceeds to a box 156 where $K_3$ range bins of data are saved, that is a fixed number of the transformed words passed through the center of the filter bank are saved which are a majority of the words from the filter bank. Thus, the data of the sequence of interpolated words is partitioned into range bins within each patch of data with the sequence of interpolator output I-Q words being each processed as completed when determined by the box 146 for each of the first and second subswaths in sequence. After the function of the box 156 is performed, the range bins of data for each patch of data for both subswaths are transferred to a memory 158 in a sequence so that the range bin time sequence is retained. The data for the patch of interest after final range compression is thus transferred to the memory 158 and stored therein at patch identified addresses by transferring sequentially the processed data samples or I-Q words from each radar pulse return that forms each patch.

The processing next proceeds to the decision box 161 where if the patch loop has not been completed, the processing returns to the box 123 via a path 140. Thus, when the patch FFT has processed all $K_1$ samples of an output sequence for all 8 or the required number of filters, the operator enters the loop over patches to interpolate the 8 or less sequences of words from the patch filters to sequentially are completed to provide 8 interpolator output sequences or pulses of I-Q words. The second subswath is then processed in a similar manner forming a second FFT filter bank. If the active patch loop is complete, the operation then proceeds to a decision box 162. There in the box 162 a determination is made whether an adequate number of range compressed pulses ($M_1$) is available for the whole column of patches or two patches and are presently stored in the memory 158. If the answer is NO, the operation returns along the path 148 to the box 120 and, if the answer is YES, the operation proceeds to a box 164 of a final azimuth compression function 166 where the two patches of data words completed by the final range compression as stored in the memory 158 are processed in sequence. In the box 164, $M_1$ pulses are weighted and in a subsequent box 168, an $M_2$ point FFT filter bank is formed, the box 168 integrating as an FFT a selected number of corresponding range bin output words so that the output I-Q words from the range compression are divided into cross range words each representing a pixel on the surface being mapped. This process is repeated for each range bin in each of the two subswath. $M_2$ can be determined from a look-up table 167 which is developed to minimize loading of the processors. The operation then proceeds to a box 170 where $M_3$ valid pixels are saved for each range bin for final display. The operation then proceeds to a box 172 where the I-Q data is log detected and gain adjusted to form a displayable resultant from the complex I-Q words, as is well known in the art. The video data for two patches, in the illustrated system, is transferred to an output buffer function 174 in the processor memory, and is then transferred to the data combiner 86 of FIGS. 3a and 3b where the columns of data are collected from the patches of data in a proper sequence from each of the processors 80–83. The path 148 is also coupled to the output path of the output buffer 174 so that data is not combined in the combiner 86 until the entire column of data is processed and available.

Figure 5B:
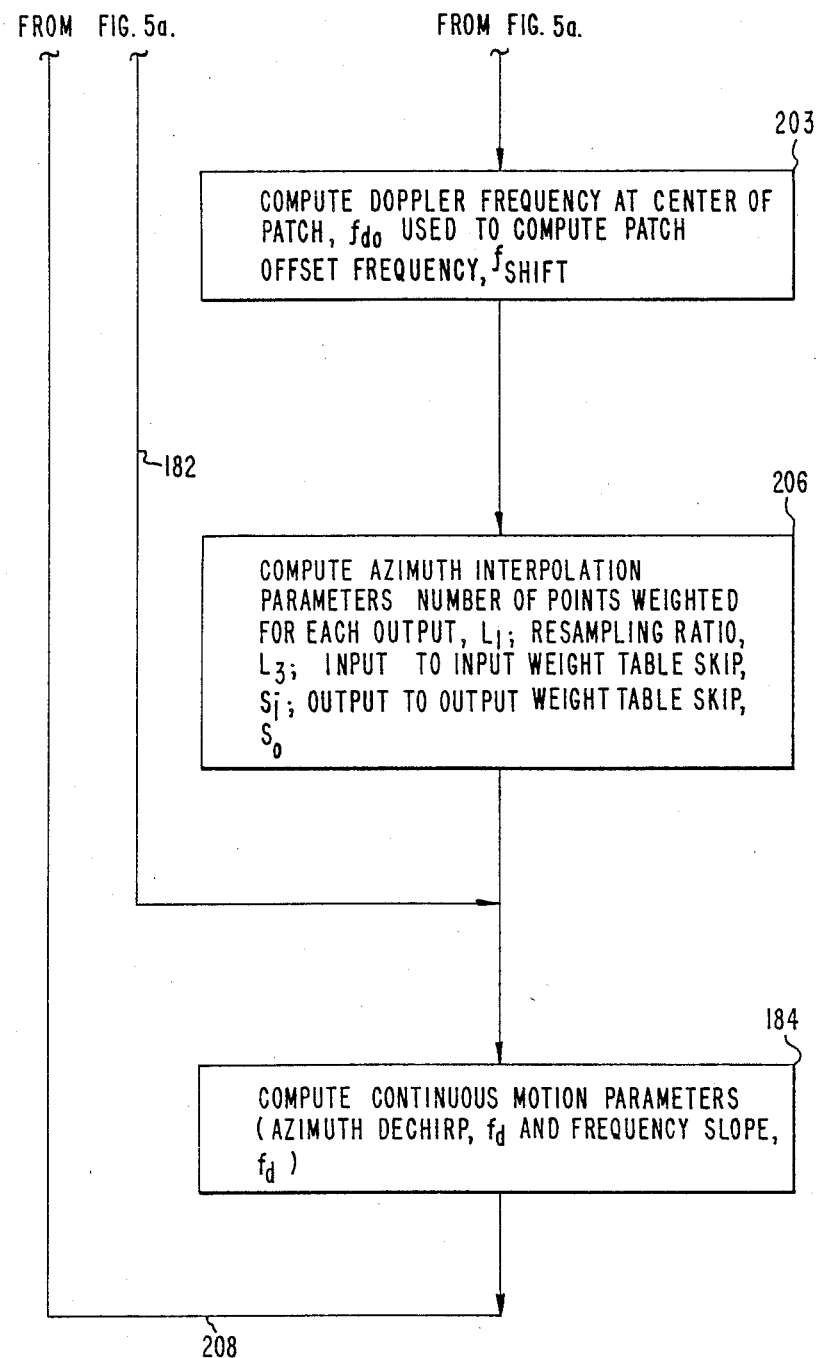

Referring now to the flow diagram of FIGS. 5a and 5b for the GPC unit 75 (FIG. 3a), the development of the control parameters for each processor 80–83 will be explained. In a box 178, the motion data from the navigation system 100 is first collected from an input buffer of the GPC unit 75 and the operation proceeds to a decision box 180 which determines if it is time to initiate motion parameters for a new column. Aircraft position, velocity, acceleration, antenna pointing information, and ground swath information are used in this determination as well as the determinations in a box 186. If the decision is NO, the operation proceeds along a path 182 to a box 184 which computes the continuous motion parameter azimuth dechirp frequency slope $\dot{f}_d$ for use in the system. If the answer is YES, the operation proceeds to the box 186 which determines the center location of the column, in cross range the number of pixels $M_3$ for each column in cross range and the FFT size $M_2$, as well as providing the range compression constant values $K_1$, $K_2$ and $K_3$. The center location of the next column is placed $M_3/2$ pixels in cross range along the scene center line from the edge of the previous column. In a box 202, $f_{pix}$, the frequency separation of the pixels for each subswath is then computed; this value being less for the subswaths of greater range than at near range. The operation then proceeds to a box 203 where Doppler frequency $f_{do}$ at the center of the patch is computed, which parameter is used to compute patch offset frequency $f_{shift}$ in the signal processors. The next step is in a box 206 in which the azimuth interpolation parameters are computed. These parameters are $L_1$, the number of points weighted for each output; $L_3$, the resampling ratio; $S_i$, the input to input weight table skip ratio; and $S_o$, the output weight table skip. The parameters $S_i$ and $S_o$ are utilized to address the correct weights from $N_w$ weights stored in a look-up table 139 of FIG. 4b. The operation then proceeds to the box 184 where the continuous motion parameters, the azimuth dechirp frequency $f_d$ and the slope $\dot{f}_d$ for each subswath are calculated. The dechirp frequency slope $\dot{f}_d$ is added to $f_d$ in the processors for each subswath. A path 208 moves the processing function from the box 184 to the input of the box 178 so that the operation is continuously repetitive.

For determining the location of the next column in the box 186 $f_{pix}$, the pixel separation of the pixels in the next column based on approximate location is computed from the equation:

$$f_{pix} = \frac{2V}{\lambda} \sin \theta \frac{d_s}{R}$$

where:
R is the range to the center of the near range patch;
$\theta$ is the angle between the craft velocity vector and the direction of transmission;
$d_s$ is the cross range spacing; and
V is the velocity of the craft.

A determination is then made as to the number of pixels to be in the next column to be formed. $M_3$ and $M_2$ are then calculated, as will be explained relative to the interpolator, and the center of the next column is located.

Referring now to FIG. 6 which shows a passband of a patch filter bank, the patch filters and their frequency overlap will be further explained. The patch FFT filter is implemented by selecting the parameters $N_1$, $N_2$ and $N_3$ which is done by considering the parameters shown in FIG. 6. For a given number of amplitude weights $N_1$, the filter bandwidth or patch filter passband at the near range of the swath and thus the maximum allowable patch size decreases as the skip $N_3$ is increased. The maximum patch bandwidth $f_{pw}$ can be determined by considering the filter shown in FIG. 6 in which the output sampling frequency relative to the input sampling rate is $1/N_3$. The center of a patch 220 is midway between two patch filters 222 and 224 so that the offset from the nearest filter is maximum. The patch FFT filter width must be selected so that patches of a selected maximum frequency bandwidth are always completely contained in one filter passband. The offset of the patch center in the condition shown from the patch filter center is $1/2N_2$. The maximum allowed bandwidth of the patch 220 is determined by requiring that the patch 220 be entirely contained within the filter passband. The maximum patch bandwidth $f_{pw}$, which is at near range allowed by this constraint satisfies the following:

$$\frac{1}{2N_2} + \frac{f_{pw}}{2} = \frac{1}{2N_3} - \frac{\Delta}{2} \text{ and}$$

$$f_{pw} = \frac{1}{N_3} - \frac{1}{N_2} - \Delta$$

where $\Delta$ is the transition width relative to the radar PRF of the effective PRF when azimuth presumming is utilized, as explained relative to FIGS. 3a and 3b. An approximate expression for the transition width $\Delta$ is:

$$\Delta = \frac{1.69}{N_1}$$

Thus, $$f_{pw} = \frac{1}{N_3} - \frac{1}{N_2} - \frac{1.69}{N_1}$$

which is utilized to compute the FFT patch filter parameters.

Referring now to FIG. 7, the overlapping patch FFT filters are shown at near range and at far range varying over the cross range dimension as a function of filter index. Note that the cross range location of a given patch filter is essentially random from subswath to subswath because of the independent, continuous integration of the different azimuth dechirp frequency slopes in each subswath (see the illustrative filter numbers on the filter index as in near and far range conditions). Near range patches P1-P8 are respectively aligned in columns with far range patches P1'-P8' after the processing has been completed. The patches thus will all have the same cross range width across subswaths. Because the interpulse data rate for each subswath is the same, each of the filter passbands such as 226 and 228 has the same frequency width and frequency separation from the adjacent passbands. A filter passband 226 at near range therefore has a cross range width which is less than the cross range width of a filter passband 228 at far range. The overlapping is selected so each patch is always fully contained in a filter passband. Overlapping FFT passbands are formed by controlling the weighting parameters, as is well known in the art. As illustrated at far range in the filter passband 228, more than one patch of data may be contained in a single filter and because each patch of a column is processed at a different time with each patch having a filter number $n_p$ and because of the narrow band interpolator filters, this condition is satisfactory. Another satisfactory condition is when some passbands do not contain a patch and are not utilized. In both of these overlapping passband conditions, the processor is programmed when calculating $f_{shift}$ to shift the data corresponding to each patch of the two subswaths from the correct selected patch filter to zero frequency.

Figure 8:
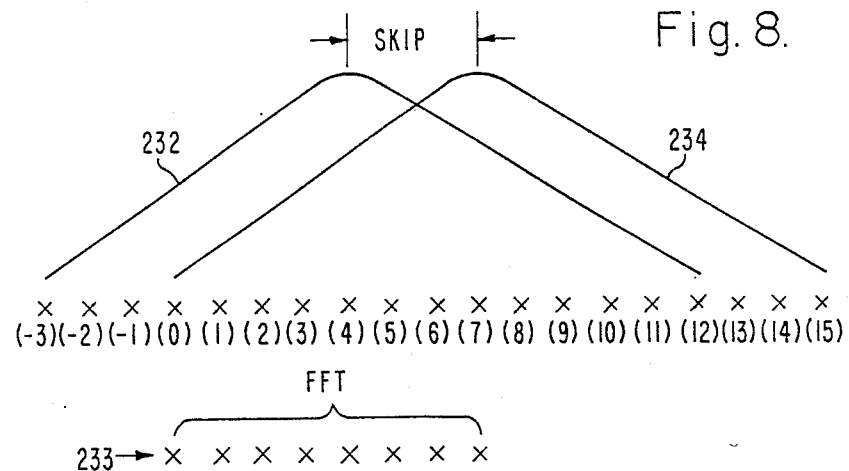
FIG. 8 is a schematic diagram showing the data from a plurality of pulses, the amplitude weights and the filter outputs for explaining the operation of the patch FFT filters.

Referring now to FIG. 8, as well as back to FIGS. 4a, 4b and 4c, the patch FFT function will be explained relative to an eight-point FFT for forming filter passbands for a lesser number of columns. Because the data return from each received pulse contains data from a number of patches columns on the surface being mapped, a plurality of patch FFT passbands may simultaneously pass, patch data to suitable temporary storage memories. The first step as performed by the decision box 124 is to skip $N_3$ pulses or sequences of binary I-Q words as is shown by the illustrated skip of three pulses of the amplitude weighting indicated by amplitude curves 232 and 234 representing two iterations. In this step, the data rate is effectively reduced by a factor of $N_3$ or three for each column of data in the swath. The weighting of $N_1$ samples in azimuth stored in the processor memory, which are sixteen in the illustrated system, is then performed in the box 128 to provide amplitude weighting of sample I-Q input words (0) to (15) shown by the curve 234, the input I-Q words (0) to (15) representing corresponding I-Q words of the time or sample sequences provided by transmitted pulses. The skip interval determines the number of output pulses of data words but the skipped I-Q words are utilized in the patch filter processing of the boxes 128 and 129 (FIG. 4a).

Data turning is then performed in the box 129 of combining $N_1$ weighted pulses of I-Q words to from the corresponding I-Q words of $N_2$ pulses where $N_2$ is usually an integral power of 2. In the data turning, weighted samples (0+8), (1+9), (2+10), (3+11), (4+12), (5+13), (6+14), and (7+15) are summed to form eight output signals I-Q words as indicated by signals 233. Thus, the second half of the weighted I-Q words are added to the first half of the weighted I-Q words completing the amplitude weighting and data turning for one of the I-Q words of the sequence or pulse of I-Q words currently provided by the azimuth dechirp box 122. An $N_2$ point FFT is then performed in the box 131 for forming eight wide filter passbands spanning the patches located in the azimuth pre-filter. As data from each pulse is received, the patch FFT functions to help separate the I-Q data words into columns of data corresponding to the columns on the mapped surface.

After the filters are formed, the appropriate patch FFT filter number $n_f$ is determined in the box 132 for the patch of interest and the output data of that filter is used for that patch. Because the dechirp frequency ramp 33 as shown in FIG. 2 differs from subswath to subswath, patches of a column are generally in different patch filter passbands for each of the subswaths. The azimuth dechirp reference frequency, the Doppler frequency at the center of the patch and $N_2$ identify the filter number $n_f$ as follows:

$$n_f = \text{INT}[N_2 \text{FRAC}(f_{do} + F_d + 1/2N_2)]$$

where:
INT denotes integral part,
FRAC denotes fractional part,
$f_{do}$ is the Doppler frequency at center of patch normalized by the PRF, and $f_d$ is the dechirp frequency normalized by the PRF and is updated at each pulse by adding $\dot{f}_d$ to $f_d$.

$$f_{do} = \frac{2\dot{R}_R}{\lambda PRF}$$

where $\dot{R}_R$ is the range rate of patch center.

$$\dot{f}_d = -\frac{2}{\lambda} \frac{\ddot{R}_c}{PRF}$$

where $\ddot{R}_c$ is the second derivative of range to the scatterer at the beam center. The parameters $\dot{R}$ and $\ddot{R}$ are calculated in the GPC unit 75 as continuous parameters from the location of the patches on the surface being mapped and from the craft position, as is well known in the art.

Figure 9:
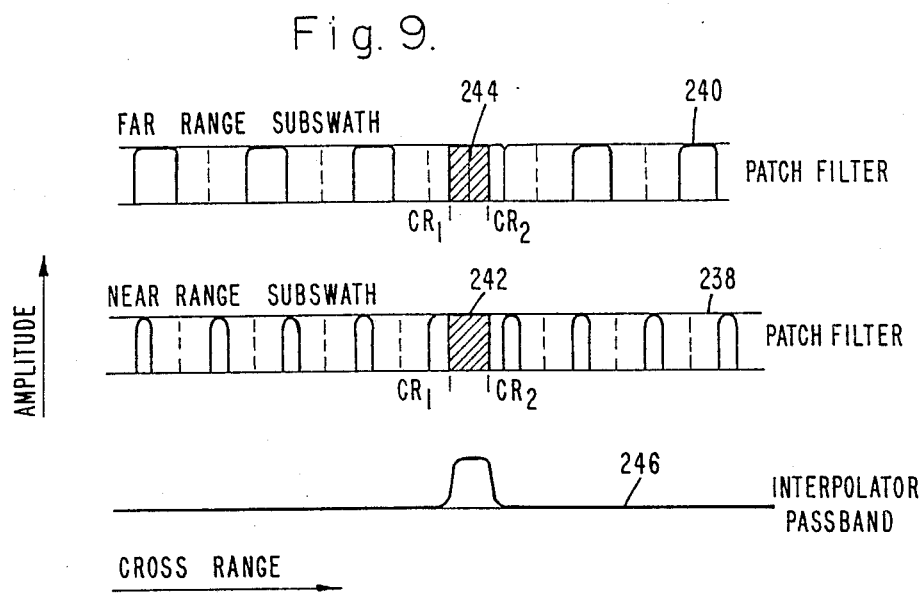
FIG. 9 is a schematic diagram of amplitude as a function of cross range for explaining the interpolator passband relative to the patch filter passbands.

For further explanation of the interpolator function, reference is now made to FIG. 9 which shows, as a function of amplitude and cross range, a near range subswath patch filter bank 238 and a far range subswath patch filter bank 240, the filters of which respectively cover a smaller and greater width of mapped surface area. Patches 242 and 244 from cross ranges $CR_1$ to $CR_2$ fall in a single filter passband of respective filters 238 and 240, which filters have a preselected overlap in cross range. An interpolator filter passband 246 has a single narrow passband in the cross range dimension with the passband shown representing the position of the interpolator passband at all range subswaths. By frequency shifting each I-Q data word from each patch to zero frequency, the interpolator filter maintains the column alignment of the patches of data in cross range.

Referring now to FIG. 10 which shows amplitude as a function of frequency, a patch filter bank 248 in a near range subswath shows a patch of return data 250 from column $C_0$, for example. An interpolator passband 252 for the corresponding patch 250 is centered at zero frequency or DC, and the frequency shift $f_{shift}$ required for the patch 250 is relatively large because of the filter selected. The frequency shift $f_{shift}$ shifts the patch of interest data from the filter passband at which it appears so that the patch center will be at DC. A patch 254 in the passband of a patch filter 256 is shown at a far range subswath. Because the azimuth dechirp reference frequency is a frequency ramp that repeats at a different time for each subswath, the patch filter number for the patch of interest at any subswath for a column may be different. An interpolator passband 258 centered at DC shows the required frequency shift $f_{shift}$ at far range. The filter number for the patch of interest varies in each subswath so the filter number $n_f$ is calculated for each patch of interest. Each subswath is processed by a separate interpolator passband. Thus, the parameter $f_{shift}$ is different for each patch in a subswath because the azimuth dechirp frequency $f_d$ at the start of each patch in a subswath will be different. The frequency shift is calculated from:

$$f_{shift} = N_3 \text{ FRAC } [f_{do} + f_d]$$

where:
FRAC denotes fractional part to be used,
$f_{do}$ equals the Doppler frequency at the center of the patch as calculated by the GPC from geometry as discussed earlier, and
$f_d$ equals the azimuth dechirp frequency.

The value of $f_{shift}$ is the frequency shift normalized by the sampling rate at the output of the patch FFT filter. The interpolator passband is not significantly wider than the patch bandwidth at all subswaths. As shown, the passband 258 at far range is narrower in frequency than the passband 252 at near range to correspond to the bandwidth of the patch. The bandwidth of the interpolator filters is varied at different range subswaths by varying the output sampling rate of the interpolator. It is to be noted that if it were not for the patch filters, the bandwidth of the input signals and the data rate into the interpolator would be excessive.

The interpolator is a resampling filter and the output rate is calculated to correspond to the required pixel spacing. Given a certain cross range pixel spacing $d_s$, the number of pixels in azimuth within a patch can be approximately computed as:

$$M_3 = \text{INT}\left(\frac{f_{pw} PRF}{f_{pix}}\right)$$

where:
INT denotes the integral of,
$f_{pix}$ is the pixel frequency separation, and
$f_{pw}$ is the patch bandwidth.

Based on the value of $M_3$, the best FFT size $M_2$ for the final azimuth compression function 166 of FIG. 4c can be determined. In the illustrated system, $M_2$ is determined from the look-up table 167 of FIG 4c which is made up to optimize loading. The number of samples weighted for the azimuth nd range compressions ($M_1$ and $K_1$, respectively) is determined from the ratio of the pixel spacing to the required resolution. The parameters $K_1$, $K_2$ and $K_3$ used for range compression are dependent on system considerations and are constants stored in the computer memory. Some zero filling may be required since $M_1$ may be less than $M_2$.

The frequency separation between adjacent azimuth compression FFT filters can be expressed as:

$$f_{AZ} = PRF \left(\frac{1}{N_3}\right)\left(\frac{1}{L_3}\right)\left(\frac{1}{M_2}\right)$$

where: $L_3$ is the azimuth interpolator resampling ratio.
Setting $f_{AZ}$ equala to $f_{pix}$, $L_3$ can be determined as:

$$L_3 = \frac{PRF}{N_3 M_2 f_{pix}}$$

The average number of pulses weighted by the azimuth interpolator for each output point is approximately given by:

$$L_1 = \frac{1.69 L_3}{1 - M_3/M_2}$$

The azimuth interpolator in the illustrated system is mechanized with weights selected from a look-up table of $N_w$ weights. The input to input weight table skip $S_i$ gives how many weights should be skipped from input to input for a given output. The output to output weight table skip $S_o$ gives the number of weights skipped in the table from output to output for each input. $S_o$ determines the number of outputs to which each input contributes. The average number of outputs to which each input contributes is $N_w/S_o$ and also $L_1/L_3$. Thus, $$S_o = \frac{L_3 N_w}{L_1}$$

The ratio of $S_o$ to $S_i$ is the resampling ratio, so:

$$S_i = S_o/L_3$$

It should be noted that $S_o$ is constant for an entire column but $S_i$ decreases as range increases.

In some systems, in accordance with the invention, several interpolator weight tables may be stored in the processor memory. These look-up tables are optimized to reduce loading for different ratios of $M_3/M_2$ and the correct table is determined by table look-up from the value of $M_3$.

The output sampling rate $SR_o$ of the interpolator is:

$$SR_o = \frac{PRF}{N_3} \frac{S_i}{S_o}$$
$$= M_2 f_{pix}$$

For a given cross range spacing of the pixels, the Doppler width between pixels becomes less at far range. The pixel spacing $d_s$ will correspond to the normalized frequency based on the sampling frequency out of the azimuth interpolator and the number of points in the azimuth compression FFT functions $M_2$. Since equal cross range pixel spacing in distance is desired, the system will require different output sampling rates out of the azimuth interpolator as a function of range or from subswath to subswath. The system thus has a different output sampling rate $S_{RO}$ for each subswath in the column and this is provided by varying the values of $S_i$ at each subswath. The processor operating at its clock frequency stores the signals provided by the varying output sampling rate so that the data is transferred to the next function or range compression function at a constant rate, the net result of a lower sampling rate being that the processor has more time for other iterations.

Referring now to FIG. 11, as well as to FIGS. 4a-4c, an interpolator implementation which performs weighting and summing is illustrated responding to input I-Q words $X_{out(0)}$ to $X_{out(13)}$, with a skip ratio $L_3$ of 4/3 for one subswath. The $X_{out(0)}$ to $X_{out(13)}$ data are successive outputs from a single patch FFT filter. The selected number of input signals weighted by $L_1$ per output is six in the illustration to provide amplitude curves, such as 258, 259 and 260, in response to sequentially multiplying $X_{out(0)}$ to $X_{out(13)}$ values by the weights obtained from the look-up table. Three output signals $Y_{out(0)}$ to $Y_{out(6)}$ are derived from the fifteen input signals with a time spacing such that the input sampling frequency has been reduced by a factor of 4/3. The weighting and summing is performed in the box 138 of FIGS. 4a-4c. In the mechanization described in FIGS. 4a-4c, all the contributions of a single output pulse or sequence of $K_1$ words from the patch FFT. to the forming outputs are made before the next output sequence for the next patch is received. This eliminates the need for extensive buffering of the patch FFT outputs. Thus, in the example in FIG. 11, $X_{out(7)}$ contributes to $Y_{out(1)}$ through $Y_{out(4)}$. Then $X_{out(8)}$ contributes to $Y_{out(1)}$ through $Y_{out(5)}$ (completing $Y_{out(1)}$), and so on. In this example, the average number of output contributions per input I-Q word is $$\frac{N_w}{S_o} = \frac{L_1}{L_3} = 4.5.$$

In summary, the azimuth interpolator process is just a filtering of corresponding I-Q words of multiple input pulses or sequences of I-Q words to provide output pulses or sequences of I-Q words at a subswath dependent output sampling rate $S_{RO}$ with a frequency passband matched to the desired patch bandwidth for that particular subswath. This process will pass aligned cross range data of equal width for each subswath and will therefore allow for the output of an aligned column.

The final range compression function 152 of FIGS. 4a–4c is similar to that shown in FIG. 8 as to $K_1$ samples with an interpolator output pulse being weighted in the box 150 and a $K_2$ point FFT being formed in the box 154. The outputs of $K_3$ filters which are a fixed number of center filters and the majority of the filters of the FET filter bank are then saved, each I-Q word corresponding to a range bin. The second subswath for a sequence from each patch is then processed through the patch FFT, azimuth interpolation and range compression in an identical manner. This final range FFT function creates range bins I-Q words for each patch and subswath within a column. The azimuth compression function 166 in the boxes 164, 166 and 170 is similar to the range compression except that the data operated upon sequentially is among a plurality of different pulses or sequences of I-Q words as stored in the memory 158 from the range compression operation in the cross range dimension of the data. The final azimuth compression, which is similar to the function explained relative to FIG. 8, forms the required number of display pixels in the cross range direction for the corresponding I-Q words for each patch and range bind within a column.

Referring now to the waveform of FIG. 12 showing amplitude as a function of time, the range gating to define the mapped area in range will be explained. A pulse 270 of a waveform 272 is the frequency chirped pulse transmitted to the surface being mapped. A receive time gate defines the return signals 274 over the range of the swath being mapped, the return signals from each pulse forming a frequency sloped series of return signals from the area being illuminated. Range a few illustrative sampling, as shown by sample lines 276, is performed and the time sequence of range samples from a single pulse are then passed to the range dechirp unit 78, as shown in FIGS. 3a–3b. Additional pulses, such as 277, are transmitted at the PRF and the return data from each pulse is sampled in the A/D converter, dechirped and then processed.

Referring now to the overall data collection and processing timing diagram of FIG. 13, the data collection from a plurality of transmitted pulses is shown by groups, such as 278–283 of sampled data. In this example, there are six skipped pulses per group but any desired skip number may be utilized. The pre-processing or PRE is performed for the return samples from each transmitted pulse in PRE processing periods 288–294 during each of which the patch filtering function, the azimuth interpolator function and the final range of function are performed on the data previously received and in the buffer storage unit 74 of FIGS. 3a–3b. The pre-processing period 288 is delayed in time from the time of the group 278 of input data and the pre-processing time periods 289 and 290 are delayed from the time of respective groups 279 and 280 at a decreasing amount. These delays are caused by the post-processing time period 298 in which the final azimuth FFT function is performed, taking longer than the pre-processing periods. An idle time is provided in the processor after pre-processing period 290 and the pre-processing period 291 is coincident in time with the time of the collection of the group 281 since the pre-processing has caught up with the collection of data. After the post-processing period 298, the pre-processing period 292 has the greatest delay from receiving current input data decreasing sequentially at pre-processing periods 293 and 294. The number of pre-processing periods between post-processing periods is determined by the number of sequences of data or pulses that are processed for each patch and by the two subswaths sequentially processed by each programmable signal processor, in the illustrated system. Because of this delay in pre-processing, a plurality of pulses must be stored in the buffer storage unit 74 of FIGS. 32. At the end of the post-processing period 298, a column of two subswaths or two patches is completed and transferred to the data combiner 86 of FIG. 3a–3b. Because the patches are all aligned and one column at a time is completed, the transfer, accessing and computations of the data is greatly simplified in the procedures.

Figure 14:
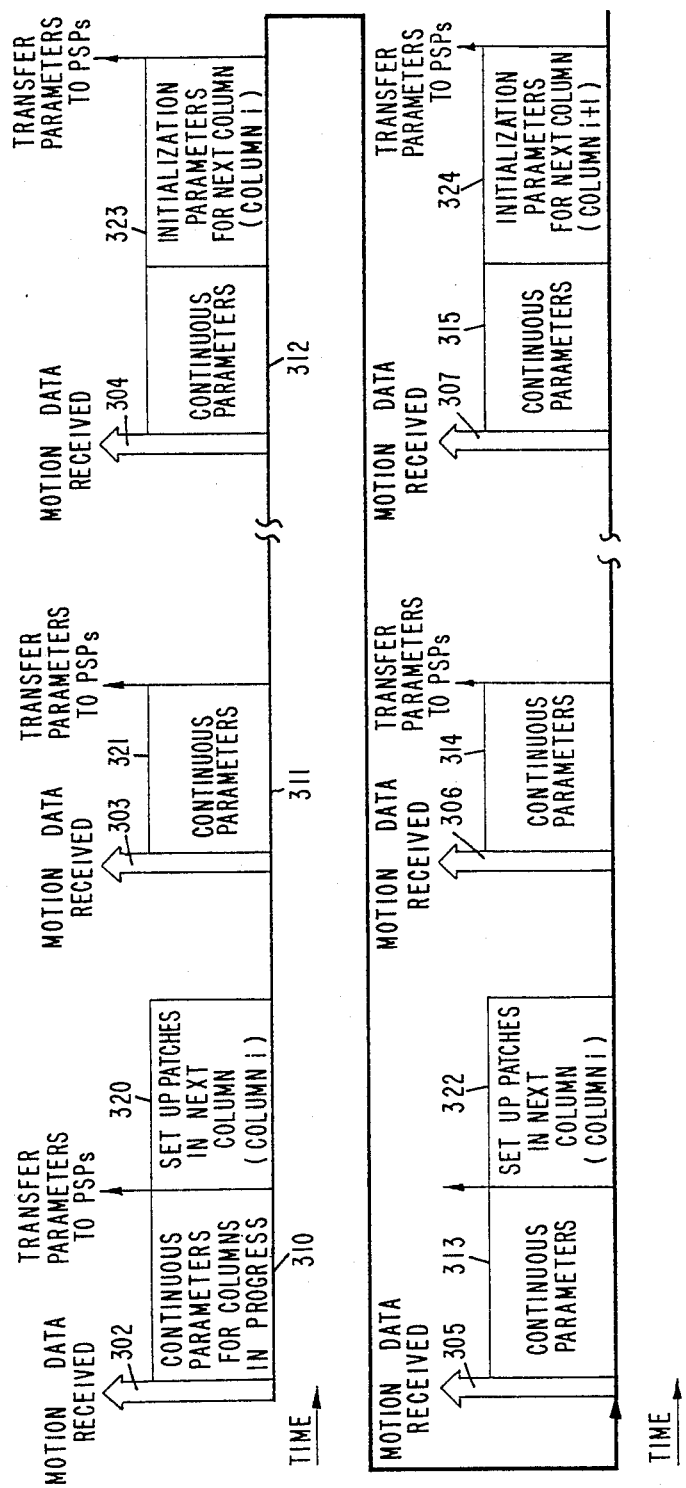
FIG. 14 is a schematic diagram showing, as a function of time, the formation of parameters in the general purpose computer.

Referring now to FIG. 14, which is an overall timing diagram of the GPC unit 75 of FIG. 3a, the motion data is received from the navigation system 100 at times as indicated by arrows 302–307. During periods 310–315, the continuous parameters (such as $\dot{f}_d$) are computed for the columns in progress followed by a transfer of these parameters to the processors 80–83. After this transfer of parameters from the period 310, the processors use those parameters until transfer of updated parameters occurs following the period 311. In periods 320 and 322, following respective periods 310 and 313, the GPC calculates the locations of patches in a new column from the geometry of the mapped area in the new column. After the time period 312, at which time a column of data processing has been completed, the initialization parameters for the next column i are computed in a period 323 and these column initialization parameters are then transferred to the processors. Similarly, for the next column after the period 315, the initialization parameters for column i+1 are computed in a period 324 and transferred to the processors. Thus, the operation continues, processing one column of data at a time.

Thus, there has been described a synthetic aperture radar processing system in which the data from the transmitted pulses, after being partitioned into subswaths, is partitioned by frequency alignment into patches of column data that are sequentially aligned in columns corresponding to the patches of the mapped surface for forming a map of that area. The partitioning is performed by utilizing overlapping wide band patch filters which pass an excessive amount of data from areas adjacent to and including each patch followed by an interpolator which provides a narrow passband to substantially pass only the data representing a patch. Each patch of data is frequency shifted into the passband of the interpolator filter. The interpolator also performs a resampling function to reduce the data rate at a function of the final azimuth pixel spacing. The final range compression function sets the pixel spacing in range and the final azimuth compression function provides the final azimuth spacing of the pixels. The accessing and handling of the data in the processors is greatly simplified by forming the patches of column data sequentially aligned in cross range.

What is claimed is:

1. The method of partitioning and processing data in a synthetic aperture radar mapping system for use with a moving craft receiving a time sequence of pulse return data from each of a plurality of pulses sequentially transmitted at a predetermined PRF to a surface being mapped and having range and cross range dimensions, the return data from each transmitted pulse being sequentially sampled to form sequence of sample words at a rate determined by the radar PRF, said surface including swaths each divided into range subswaths with each subswath including adjacent cross range patches with corresponding patches in all subswaths forming columns in range, said system forming a sequence of sampled data from the pulse return data from each transmitted pulse, said method comprising the steps of:

dechirping said sequences of sampled data for each subswath into a plurality of doppler frequency bands, each representing a patch filter band;

patch filtering said sequences of sampled data for each subswath to pass data in said patch filter band with said sequences of data for each patch passing through one of said filter bands, wherein said patch filtering includes the steps of:

skipping a selected number of sequences of sampled data to provide a reduced number of sequences of sampled data for each patch, and data turning the reduced number of sequences of sampled data to provide one half of the sequences of sampled data for each patch to be applied to the patch filtering steps;

sequentially selecting patch filter bands for each subswath that pass corresponding column data;

frequency shifting the data passed through each of said patch filter bands for each subswath to a selected center frequency;

interpolator filtering for passing at said selected center frequency, the sequences of data passed through said patch filter bands in a time sequence corresponding to the positions of said columns; and, processing the sequences of data that are interpolator filtered for forming pixel display data in a time sequence corresponding to the positions of said columns.

2. The method of claim 1 wherein the step of interpolator filtering includes the step of providing a sampling rate for said sequences of data provided by said patch filtering step that is lower than said sampling rate determined by said radar PRF, said skipping step and said data turning step.

3. The method of data partitioning for use with a synthetic aperture radar mapping system in which pulses of energy are repeatedly transmitted from a moving craft to a surface being mapped from which sequences of pulse return data are received, adjacent areas of said surface being swaths with each swath including a plurality of range subswaths and with each subswath being divided into a plurality of cross range patches aligned in range columns in said plurality of said subswaths, said mapping system converting said return data received in response to each transmitted pulse to a sequence of words, said method comprising the steps of:

subswath filtering each of said sequence of words to provide sequence of words for each subswath;

azimuth dechirping each of said sequence of words to provide a doppler frequency band for each sequence of said words derived from data received from each patch of each subswath, the frequency bands for subswaths at increasing range decreasing in width;

patch filtering with frequency overlapping patch filters each sequence of words for each patch;

selecting patch filter numbers for each patch;

selecting a filter output word for each patch in sequence in said swath to provide sequences of patch filter output words;

frequency shifting the sequences of patch filter output words so that the sequences of output words of each patch are centered at a predetermined selected frequency;

interpolator filtering at said selected center frequency with band widths of decreasing size for subswaths of increasing range sequentially for each patch of each subswath, each patch filter providing a sequence of interpolator output words;

final range filtering each completed sequence of interpolator output words to provide a range sequence of a selected number of range words for each sequence of interpolator output words for each patch of each subswath; and final cross range filtering of the range words of each range sequence to provide a selected number of cross range words for each sequence of interpolator output words for each patch of each subswath.

* * * * *